(12) United States Patent
Beadle

(10) Patent No.: US 12,218,817 B2
(45) Date of Patent: Feb. 4, 2025

(54) MESSAGING PROTOCOL FOR CONFIGURING REMOTE TERMINAL UNIT

(71) Applicant: Schneider Electric Systems USA, Inc., Foxboro, MA (US)

(72) Inventor: Stephen Richard Owen Beadle, Leicester (GB)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 0 days.

(21) Appl. No.: 17/816,570

(22) Filed: Aug. 1, 2022

(65) Prior Publication Data

US 2024/0039820 A1 Feb. 1, 2024

(51) Int. Cl.
*H04L 43/10* (2022.01)
*H04L 41/0813* (2022.01)
*H04L 67/12* (2022.01)

(52) U.S. Cl.
CPC .......... *H04L 43/10* (2013.01); *H04L 41/0813* (2013.01); *H04L 67/12* (2013.01)

(58) Field of Classification Search
CPC ..... H04L 43/10; H04L 41/0813; H04L 67/12; H04L 67/025; H04L 67/34; H04L 67/562
See application file for complete search history.

(56) References Cited

U.S. PATENT DOCUMENTS

| 10,630,702 | B1 * | 4/2020 | Irwan | H04L 9/3239 |
| 10,761,509 | B2 * | 9/2020 | Wang | G05B 19/409 |
| 11,121,930 | B1 * | 9/2021 | Johnson | H04L 67/55 |
| 2006/0240818 | A1 * | 10/2006 | McCoy | H04B 7/18567 |
| | | | | 455/430 |
| 2007/0206644 | A1 * | 9/2007 | Bertsch | H02J 13/00016 |
| | | | | 370/503 |
| 2008/0154393 | A1 * | 6/2008 | Reshef | G05B 19/4183 |
| | | | | 700/65 |
| 2009/0326731 | A1 * | 12/2009 | Bowdry | G01D 4/004 |
| | | | | 700/297 |

(Continued)

OTHER PUBLICATIONS

Extended European Search Report from EP Application Mo. 22194602.3, dated Aug. 30, 2023, 9 pages.

(Continued)

*Primary Examiner* — Javier O Guzman
(74) *Attorney, Agent, or Firm* — Stinson LLP

(57) ABSTRACT

Methods and system for configuring a remote terminal unit (RTU) device of a Supervisory Control and Data Acquisition (SCADA) system. The RTU device transmits an initial message payload to a SCADA server of the SCADA system via a broker server in accordance with a Message Queuing Telemetry Transport (MQTT) messaging protocol. The initial message payload complies with a Sparkplug specification for MQTT and includes at least one metric name and initial data and at least one PropertySet object associated with the metric name indicative of at least one parameter of the RTU device to be configured. In response to the initial message payload, the SCADA server transmits a subsequent message payload to the RTU device via the broker server. The subsequent message payload also complies with the Sparkplug specification and includes one or more values for the PropertySet object for configuring the at least one parameter of the RTU device.

13 Claims, 3 Drawing Sheets

(56) References Cited

U.S. PATENT DOCUMENTS

| | | | | |
|---|---|---|---|---|
| 2010/0050017 | A1* | 2/2010 | Almadi | E21B 47/12 |
| | | | | 713/400 |
| 2017/0187597 | A1* | 6/2017 | Nolan | H04L 43/0888 |
| 2018/0159954 | A1* | 6/2018 | Lu | H04L 67/61 |
| 2020/0015792 | A1 | 5/2020 | Stout et al. | |
| 2020/0252288 | A1* | 8/2020 | Al-Yousef | H04L 41/0886 |
| 2020/0265146 | A1* | 8/2020 | Al-Yousef | G06F 11/1492 |
| 2020/0344189 | A1* | 10/2020 | Cui | H04L 67/55 |
| 2021/0182307 | A1* | 6/2021 | Ober | H04L 67/565 |
| 2022/0021667 | A1 | 1/2022 | Wellig et al. | |
| 2022/0141290 | A1* | 5/2022 | Chelmecki | H04L 67/562 |
| | | | | 709/220 |
| 2022/0206470 | A1* | 6/2022 | Wallace | G05B 19/4185 |
| 2022/0356796 | A1* | 11/2022 | Samuel | E21B 43/30 |

OTHER PUBLICATIONS

Sparkplug™ MQTT Topic & Payload specification. Ver. 2.2. https: sparkplug.eclipse.org/specification/(Eclipse foundation), Oct. 19, 2021, 68 pages.

First Substantive Examination Report, and translation thereof, SA Application No. 122440288, dated Apr. 15, 2024, 19 pages.

First Substantive Examination Report and Search Report, and translation thereof, AE Application No. 122440288, dated Oct. 10, 2024, 10 pages.

* cited by examiner

```
▼object
    timestamp: 1651848869519
  ▼metrics: array[10]
      ▶ 0: object
      ▶ 1: object
      ▶ 2: object
      ▶ 3: object
      ▶ 4: object
      ▼ 5: object
          name: "Analog 06"
          alias: 6
          value: 0
          type: "float"
        ┌─────────────────────────────┐
        │ ▼properties: object         │
        │    ▼Units: object           │
        │        type: "String"       │
        │        value: "feet"        │
        └─────────────────────────────┘
      ▶ 6: object
      ▶ 7: object
      ▶ 8: object
      ▶ 9: object
```

FIG. 3

MESSAGING PROTOCOL FOR CONFIGURING REMOTE TERMINAL UNIT

BACKGROUND

In a typical industrial automation system, a Supervisory Control and Data Acquisition (SCADA) system communicates with many industrial assets, including smart devices such as remote terminal units (RTUs) and programmable logic controllers (PLCs). These devices provide remote industrial or resource monitoring and control and are configured for use in a particular application (e.g., oil and gas, water and waste water, renewable energy). For example, an RTU for a flow metering application requires particular configuration parameters to be managed that might be different than those of another application. Controlling configuration and other properties from both the SCADA server and device enables them to be synchronized. For example, alarm thresholds for devices can be consistent both in the field and centrally at the SCADA server.

Device and SCADA server manufacturers are known to write proprietary configuration extensions for common device communications protocols such as DNP3 and Modbus, but they fall short because they limit interoperability. WITS-DNP3 is a known protocol standard intended to standardize telemetry functionality for communications and configuration between field devices and SCADA servers but only provides limited exchange of configuration within a standardized file format.

SUMMARY

Aspects of the present disclosure exploit an implementation layer of the Message Queuing Telemetry Transport (MQTT) messaging protocol, such as the Sparkplug B specification, to define a payload to add configuration properties for an RTU device. These properties can relate to metrics (measurement points known as metrics, points, tags, or registers) in the RTU device via a set of custom properties, or related to the RTU device's functionality by deriving metrics and properties specifically to set other behavior such as for communications, data management, metering, etc. In addition, aspects of the present disclosure permit the RTU device to present custom metrics to publish configuration version information, allowing the SCADA server to detect changes made locally.

In an aspect, a method of configuring an RTU device of a SCADA system comprises establishing communication between the RTU device and a SCADA server of the SCADA system via a broker server. The SCADA system includes the SCADA server, which is configured for monitoring one or more industrial assets, including the RTU device, and providing supervisory control the assets. The broker server communicates in accordance with an MQTT messaging protocol and the SCADA server corresponds to a data collection and control host and the RTU device corresponds to an Edge of Network node in accordance with a Sparkplug specification for the MQTT messaging protocol. The method also includes receiving an initial message payload from the RTU device at the SCADA server via the broker server, and processing the initial message payload from the RTU device on the SCADA server. The initial message payload is generated on the RTU device in compliance with the Sparkplug specification and includes at least one metric name and initial data for the RTU device and at least one PropertySet object associated with the metric name indicative of at least one parameter of the RTU device to be configured. The subsequent message payload is also compliant with the Sparkplug specification and includes one or more modified values for the PropertySet object for configuring the at least one parameter of the RTU device. The method further comprises communicating the subsequent message payload from the SCADA server to the RTU device via the broker server. The RTU device processes the subsequent message payload to configure the at least one parameter based on the one or more values included in the PropertySet object of the subsequent message payload.

In another aspect, a method of configuring an RTU device of a SCADA system comprises establishing communication between the RTU device and a SCADA server of the SCADA system via a broker server. The SCADA system includes the SCADA server, which is configured for monitoring one or more industrial assets, including the RTU device, and providing supervisory control of the assets. The broker server communicates in accordance with an MQTT messaging protocol and the SCADA server corresponds to a data collection and control host and the RTU device corresponds to an Edge of Network node in accordance with a Sparkplug specification for the MQTT messaging protocol. The method also includes generating an initial message payload on the RTU device, communicating the initial message payload from the RTU device to the SCADA server via the broker server, and receiving a subsequent message payload from the SCADA server at the RTU device via the broker server. The initial message payload is compliant with the Sparkplug specification. The subsequent message payload is generated on the SCADA server in compliance with the Sparkplug specification in response to the initial message payload and includes one or more values for the PropertySet object for configuring the at least one parameter of the RTU device. The method further comprises processing the subsequent message payload on the RTU device to configure the at least one parameter based on the one or more values included in the PropertySet object of the subsequent message payload. The method further comprises the SCADA server discerning device type information in the initial message topic or payload in order to construct the available configuration parameters.

In yet another aspect, a system comprises an RTU device, a SCADA system including a SCADA server, and a broker server coupled to the RTU device and to the SCADA server. The SCADA server is configured for monitoring one or more industrial assets, including the RTU device, and providing supervisory control of the assets. The broker server is configured to communicate in accordance with an MQTT messaging protocol. The RTU device generates an initial message payload in compliance with a Sparkplug specification for the MQTT messaging protocol. The initial message payload includes at least one metric name indicating it represents a version identifier. The RTU device communicates the initial message payload to the SCADA server via the broker server. The SCADA server compares this version identifier with its records for the RTU device and is then able to respond differently depending on the version, such as to modify configuration properties in the RTU or SCADA server.

Other objects and features of the present disclosure will be in part apparent and in part pointed out herein.

BRIEF DESCRIPTION OF THE DRAWINGS

FIG. 3 is an example data format of node or device commands containing properties for use with the system of FIG. 2.

Corresponding reference numbers indicate corresponding parts throughout the drawings.

DETAILED DESCRIPTION

Figure 1:
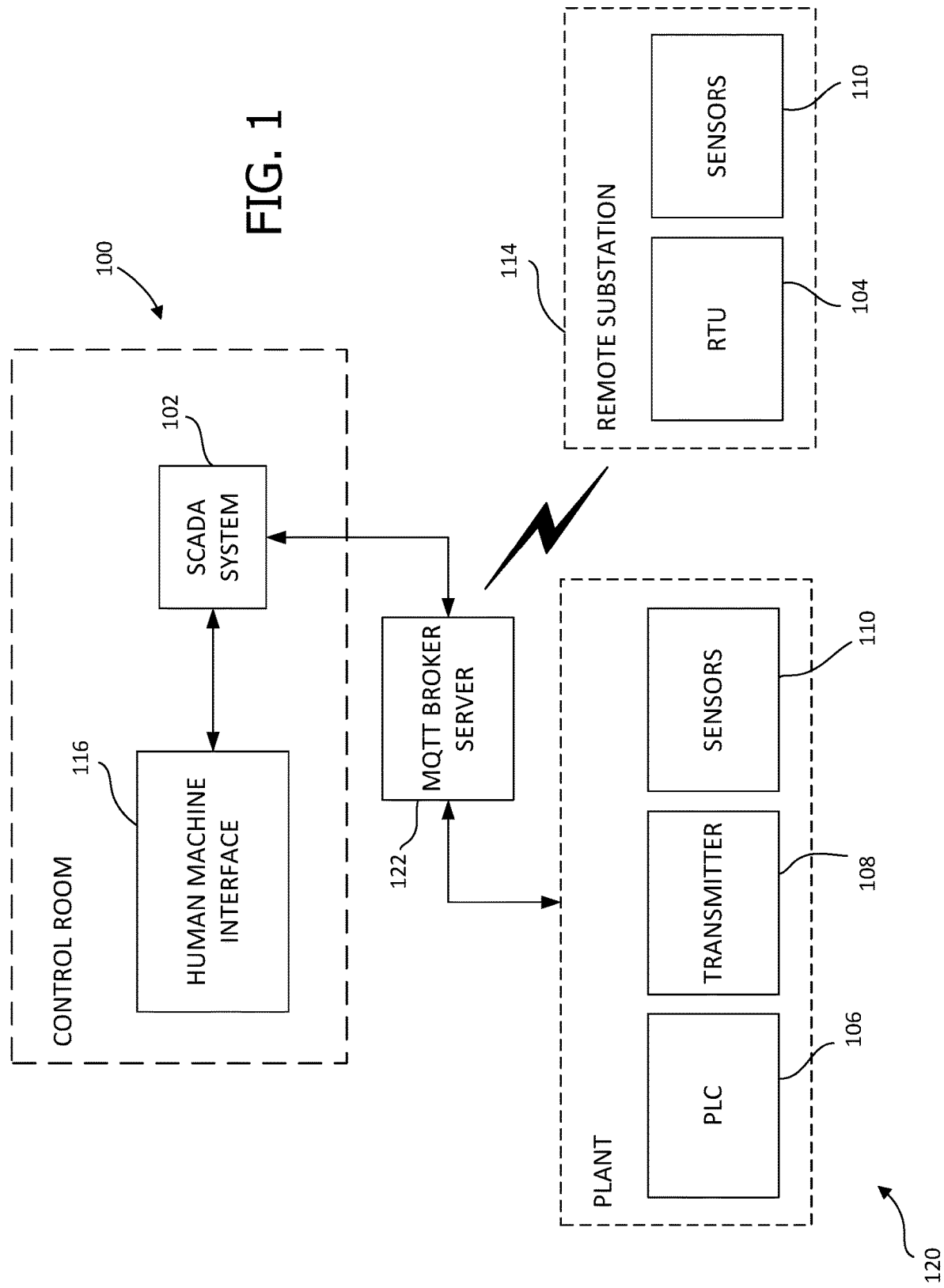
FIG. 1 illustrates an automation system according to an embodiment.

Referring to FIG. 1, a schematic overview of an automation system is generally indicated 100. The automation system 100 includes a Supervisory Control and Data Acquisition (SCADA) system 102 communicating with one or more industrial assets, generally indicated at 120. In the illustrated embodiment, the industrial assets 120 include industrial control and monitoring devices, such as a remote terminal unit (RTU) 104, a programmable logic controller (PLC) 106, a multivariable transmitter (MVT) 108, and/or a peripheral 110 (e.g., sensor, actuator, variable frequency drive, motor controller, pressure transmitter, Coriolis meter, magnetic flow meter, etc.). In another embodiment, asset 120 comprises a computing device.

As described below, aspects of the present disclosure permit adding configuration properties to a message payload for use in configuring an industrial asset 120, namely, RTU 104 or PLC 106. In an embodiment, an implementation layer of the Message Queuing Telemetry Transport (MQTT) messaging protocol, such as the Sparkplug B specification, defines the payload. MQTT is bi-directional, publish/subscribe messaging protocol for restricted low-bandwidth networks and is used in some Internet of Things (IoT) applications. Sparkplug is a specification for MQTT that defines how data is sent and received (e.g., data format, Topic Namespace, state management). In this regard, Sparkplug is an implementation layer or extension of MQTT. In an embodiment, devices, sensors, and the like at the edge of a network can use Sparkplug to communicate with applications such as SCADA systems, historians, and analytics programs. As illustrated in FIG. 1 and in FIG. 2, described below, these communications go through an MQTT broker server 122.

The SCADA system 102 of FIG. 1 is coupled to a remote substation 114 via a communications network, such as a private data radio network and/or a cellular telephone network. The substation 114 typically includes a number of peripherals 110 and at least one RTU 104 for data acquisition from substation 114 and/or from SCADA system 102. The RTU 104 transmits telemetry data to SCADA system 102 and receives messages back for controlling connected physical objects of remote substation 114.

As shown in FIG. 1, SCADA system 102 operates in conjunction with a human-machine interface (HMI) 116. The HMI 116 is an input-output device that presents process information to a human operator. The SCADA system 102 links to HMI 116 for providing maintenance procedures, detailed schematics, logistic information, trend data, diagnostic data, configuration data transfer, and the like for a specific sensor or machine. In an embodiment, HMI 116 comprises a personal computer, smartphone, tablet, touch-screen HMI device, or the like. Although illustrated in a control room remotely from the various industrial assets 120, it is to be understood that HMI 116 could be hosted on the device itself.

In addition to the RTU 104, peripherals 110, and other components of remote substation 114, SCADA system 102 communicates with at least one PLC 106. In a SCADA-based control system, PLC 106 is connected to, for example, a sensor (i.e., peripheral 110) for collecting the sensor output signals and converting the signals into digital data. The SCADA system 102 may also communicate with a multivariable transmitter, such as MVT 108, which is used to measure flow, differential pressure, temperature, pressure, and the like.

As described above, industrial automation systems, such as system 100, typically include many industrial assets 120 executing many applications. The large number of assets 120 and applications and differing uses and capabilities create a complicated situation for configuring hardware. For instance, each specific device such as RTU 104, PLC 106, MVT 108, peripheral 110, etc. has a particular purpose that can impact configuration. Aspects of configuration may be applied to various industrial assets 120 in various control systems, including one or more of RTU 104, PLC 106, MVT 108, and peripheral 110. For the sake of convenience, however, the description below refers to an example in which the industrial asset 120 is RTU 104 of SCADA system 102.

In an embodiment, the RTU 104 is used as a control device. A communication bus provides communication for the complete substation 114 and all parts of the substation are accordingly connected thereto, whether directly or indirectly. The RTU 104 is configured to be connected to a computer (e.g., a personal computer, desktop, laptop, workstation machine, etc.) of SCADA system 102 to access and control settings and parameters as well as a real-time database.

The RTU 104 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 104 in an oil and gas application include: tank monitoring and automation; well test automation; Emergency Shut-Down (ESD) at well heads; well production and optimization; and measurement.

In an oil and gas environment, for example, substation 114 is located at a well site to gather data about various aspects of the well site for monitoring and tracking purposes. The substation 114, which acts as a control unit, includes RTU 104 for collecting data on pump motor operation (e.g., motor speed and load). A variable speed drive motor controller, for example, generates this motor data. The RTU 104 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 104 can determine the tension or load (vertical axis) on the rod versus the displacement (horizontal axis) of the rod per stroke or pump cycle (i.e., upward and downward movement). Other data collected by RTU 104 from the field sensors may include fluid flow rate, temperature, pressure, and the like.

In an embodiment, RTU 104 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 104 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU 104 embodying aspects of the present disclosure involves electrical applications such as wind, solar, transformer stations, etc. Diversification of energy production resources require utility operators to manage a much wider portfolio of assets. Moreover, assets such as wind turbines and solar cells are often located in harsh, remote environments. In an embodiment, RTU 104 monitors active and reactive power, phase voltage, connection status of switches, and the like.

Yet another use case for the RTU 104 embodying aspects of the present disclosure involves autonomous, remotely located assets 120, including critical infrastructure assets, where high control system, monitoring, and reporting availability as well as data analytics associated with control systems, asset performance, and custom application features are requested.

Figure 2:
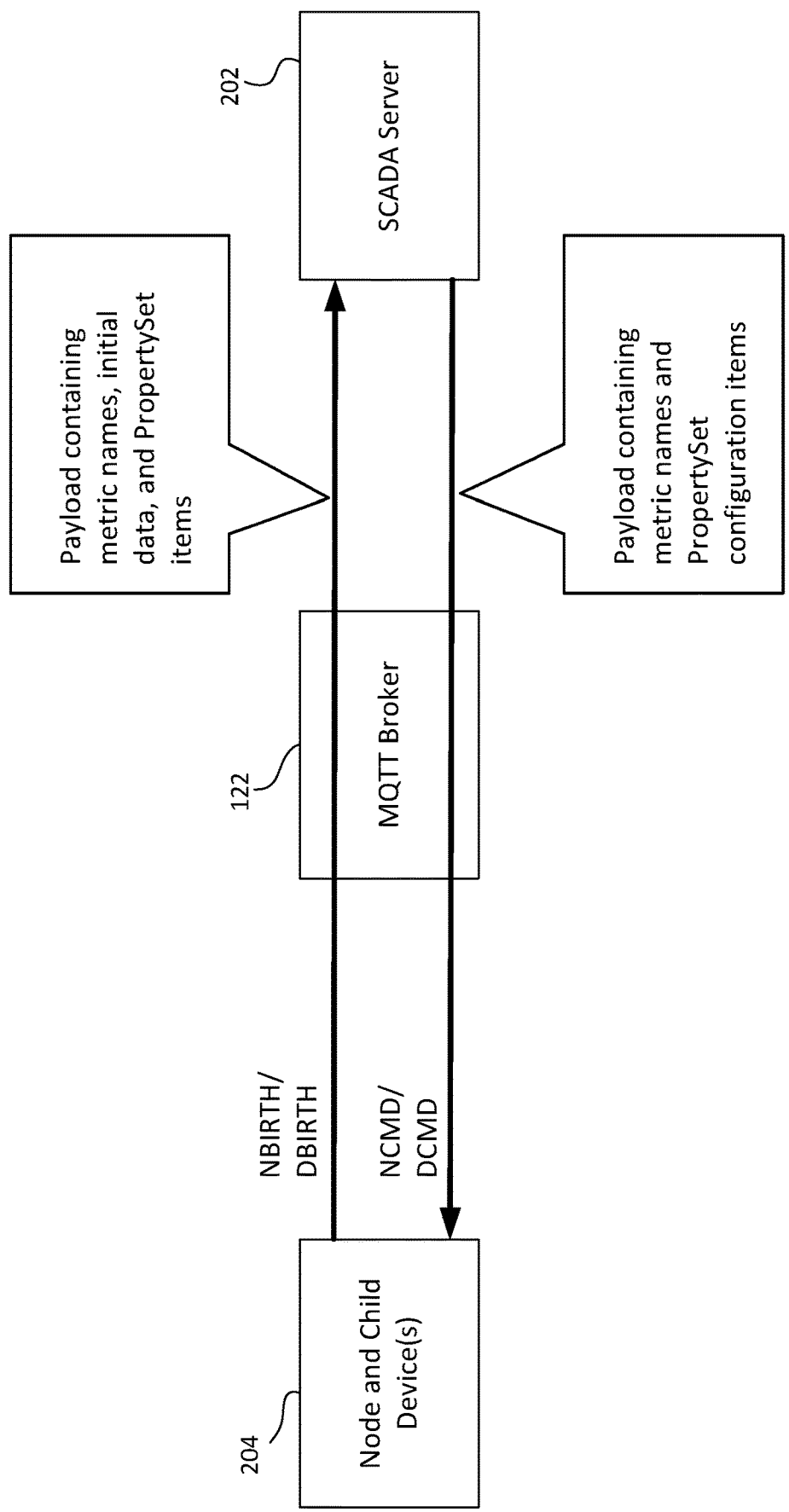
FIG. 2 is a block diagram of a system for managing configuration parameters of the industrial assets of the automation system of FIG. 1.

FIG. 2 is a block diagram of a system 400 for managing configuration parameters of RTU 104 of automation system 100 of FIG. 1. An implementation layer of a messaging protocol embodying aspects of the present disclosure contains one or more properties that define features of RTU 104. For instance, the Sparkplug protocol is an MQTT payload suitable for use in configuring RTU 104. In an embodiment, Sparkplug provides a set of operating conventions to RTU 104 for use in configuring the device. RTU functionality requires a greater number of protocol features to be defined than other industrial assets 120 and, advantageously, aspects of the present disclosure extend the Sparkplug features to support the features of RTU 104 while retaining compatibility with message formats.

As shown in FIG. 2, a central server 202 of SCADA system 102 communicates with one or more devices 204 such as the RTU 104 and PLC 106 of FIG. 1 via an MQTT broker, or server, 122. The one or more devices 204 provide data, process variables, and/or metrics and, in an embodiment, comprise one or more RTUs 104. The MQTT broker 122 is the central data distribution component of system 400 and establishes communication between the SCADA server 202 and each RTU 104. In a Sparkplug MQTT network, communication between nodes is via the central MQTT broker 122 such that there is no direct link between end nodes and the primary application (control node).

Although referred to generally as devices, it is to be understood that node and child devices 204 include Sparkplug-enabled Edge of Network (EON) nodes and Sparkplug-enabled devices configured to communicate with the MQTT broker 122. EON nodes provide physical or logical gateway functions for sensors/devices that do not implement Sparkplug themselves. In this manner, EON nodes enable these devices to participate in the MQTT Topic Namespace. The devices 204 and SCADA server 202 communicate through broker 122 in accordance with the MQTT protocol. The MQTT broker 122 is responsible for authentication, authorization, state management of the participants, and data distribution within system 400. In the context of the Sparkplug specification, an MQTT EON node is a compliant MQTT client application that manages an MQTT session and provides the physical and/or logical gateway functions required to participate in the Topic Namespace and payload definitions described in the specification. The EON node is responsible for any local protocol interface to existing assets 120 (e.g., PLC 106, RTU 104, sensors 110, etc.) and/or any local discrete I/O, and/or any logical internal process variables.

In accordance with the Sparkplug protocol, SCADA server 202 corresponds to a data collection and control host and RTU 104 corresponds to an EON node. The SCADA server 202 executes a host application responsible for supervision, monitoring, and control of the MQTT EON nodes and their respective devices, sensors, etc.

Communications between applications and devices 204 go through the MQTT broker 122, which supports features such as retained messages, Quality of Service (QOS), and Last Will and Testament (LWT). Although a single MQTT broker 122 is shown, it is to be understood that a plurality of MQTT brokers may be used. The SCADA server 202 serves as a host node for receiving data from devices 204 and sending control information to devices 204. A single SCADA server 202 is shown but it is to be understood that system 102 may include a plurality of SCADA servers. The devices 204 in the illustrated embodiment (e.g., RTUs 104) comprise MQTT EON nodes configured to communicate directly with the broker 122. For instance, RTU 104 is an MQTT-enabled device that supports Sparkplug and communicates directly with MQTT broker 122 in the same manner as an EON node. In an embodiment, RTU 104 is an MQTT-enabled device and provides native MQTT functionality. In this embodiment, RTU 104 is also equipped with Sparkplug for providing the appropriate data format and topic structure such that it identifies itself as an EON node and can participate directly with the Sparkplug infrastructure. It is to be understood that one or more of the devices 204 as shown in FIG. 2 may also be child devices, in which case they communicate with MQTT broker 122 via an EON node, or may be MQTT-enabled devices, in which case they communicate directly with MQTT broker 122. As shown in FIG. 2, the system 400 uses the following messages: NBIRTH—Birth certificate for MQTT EON nodes; DBIRTH—Birth certificate for Devices; NCMD—Node command message; and DCMD—Device command message.

An initial payload on RTU 104 in the form of a BIRTH message includes one or more metric names, initial data, and PropertySet items that are compliant with the Sparkplug protocol. The PropertySet objects that are associated with RTU 104 indicate parameters in need of configuration and/or that are capable of being configured. A Sparkplug B PropertySet object is used with a metric to add custom properties to the object. In general, each PropertySet is a map expressed as two arrays of equal size, one containing keys and the other containing the corresponding values. The keys component is an array of UTF-8 strings representing the names of the properties in the PropertySet. The values component is an array of objects representing the values of the properties in the PropertySet and it must contain the same number of items that are in the keys array.

The RTU 104 communicates the initial payload to SCADA server 202 over the central MQTT broker 122 for processing. In response to receiving the initial payload from RTU 104, SCADA server 202 generates a subsequent payload in the form of a CMD message compliant with the Sparkplug protocol for RTU 104. The subsequent payload includes metric names and PropertySet configuration items for configuring the parameters of RTU 104. In this regard, both payloads contain specific metric names, data, and PropertySet items for RTU information. Aspects of the present disclosure exploit the Sparkplug B protocol payloads to add configuration properties for RTU 104. These properties relate to metrics (points) in RTU 104. In addition, custom metrics can be added to the set to allow other/all RTU properties to be set. The RTU 104 presents custom metrics to publish configuration version information, allowing the SCADA server 202 to detect changes made locally. In turn, SCADA server 202 communicates the subsequent payload to RTU 104 over MQTT broker 122 to configure the RTU parameters.

In an embodiment, the subsequent payload communicated from SCADA server 202 to device 204, takes the form of node or device commands in accordance with the Sparkplug protocol and includes a plurality of metrics. In an embodiment, each of the metrics has an associated name, alias, and metric parameters. The RTU parameters include, for example, one or more alarm thresholds, alarm priorities, alarm delay settings, data logging frequencies, data source communications settings and/or properties relating to the RTU itself such as communications and security parameters.

According to aspects of the present disclosure, controlling configuration and other properties from SCADA server 202 and devices 204 permits them to be managed in a cost-effective manner and enables a plurality of devices 204 to be synchronized. The BIRTH message published by devices 204 includes information about each device and the data it can and will send. For example, the alarm thresholds for devices 204 can be consistent in the field and in the SCADA server 202 computer. This enables replacement of a device 204 by downloading configuration to a replacement device 204. As described above, RTUs 104 are smart devices 204 connected to SCADA system 102. Applications for RTUs 104 include any remote industrial or resource monitoring, such as oil and gas (upstream and pipeline), water and wastewater distribution, renewable energy monitoring and control. Specifically, flow metering applications require configuration parameters of the application of RTUs 104 to be managed.

While Sparkplug B is oriented to data gathering and control for PLC 106, functionality of RTU 104 requires remote configurability. The remote configurability applies to many functions in RTU 104, including: data logging rates and rules per metric, such as frequencies and thresholds; metric scaling and signal conditioning, such as engineering unit conversion and digital input de-bounce; and RTU core behavior, such as communications parameters and setting security parameters.

Aspects of the present disclosure provide functionality by extending properties of the Sparkplug payload to: send metric configuration properties from SCADA server 202 to device 204 using the PropertySet properties of Sparkplug and present common RTU properties in a consistent manner. In addition, extending properties permits recording and updating configuration versioning and other change-related information using specific metrics.

FIG. 3 is an example data format of node or device commands containing properties for use with the system of FIG. 2 to send from SCADA server 202 to RTU device 104 via broker server 122. In this example, data is compressed in binary form to a ProtoBuf format. A Sparkplug payload contains a series of metrics (readings). The metric has a: Name; Alias; Time stamp; Data type; and Value. A Sparkplug B PropertySet object is used with a metric to add custom properties to the object. The PropertySet is a map expressed as two arrays of equal size, one containing the keys and one containing the values. FIG. 3 shows ten signals (i.e., metrics) 0 to 9. For the metric name "Analog 6," the RTU 104 is configured for data having "string" type units in "feet."

APPENDIX A, below, lists a range of example properties that can be associated with Sparkplug metrics and information within a Sparkplug payload in the ProtoBuf format for configuring and managing asset 120 (e.g., RTU 104).

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

APPENDIX A

Example properties that can be associated with Sparkplug metrics and information within a Sparkplug payload in the ProtoBuf format for configuring and managing asset 120 (e.g., RTU 104) include:
  Analog point properties;
  Engineering full scale;
  Engineering zero scale;
  Signal address;
  Deviation deadband;
  Multiple alarm limits (High, Log, No Change);
  Actions to be taken when limits are crossed;
  Rate of change properties;
  Digital point properties (can apply to multiple bit digital inputs as an integer);
  Signal address;
  Debounce time;
  State invert;
  Alarm/event states;
  Persistences into state and out of state;
  Actions to be taken in alarm states;
  RTU/Outstation/Meter properties;
  Addressing and communications channel data (channels can be mapped to metrics);
  Routing and networking information;
  Flow run parameters and 'connections' to signals;
  Other object types;
  Scanning parameters for connected devices such as Modbus servers;
  Binary objects for control sequences, plus their run command/state; and
  Security parameters such as firewall settings and user or user group settings.

The invention claimed is:
1. A method of configuring a primary remote terminal unit (RTU) device of a Supervisory Control and Data Acquisition (SCADA) system, the SCADA system comprising a SCADA server configured for monitoring one or more industrial assets and providing supervisory control thereof, the industrial assets including the primary RTU device and a secondary RTU device, the method comprising:
  establishing communication between the primary RTU device and the SCADA server of the SCADA system via a broker server, wherein the broker server communicates in accordance with a Message Queuing Telemetry Transport (MQTT) messaging protocol, and wherein the SCADA server corresponds to a data collection and control host and the primary RTU device corresponds to an Edge of Network node in accordance with a Sparkplug specification for the MQTT messaging protocol;
  receiving an initial message payload from the primary RTU device at the SCADA server via the broker server, wherein the initial message payload is generated on the primary RTU device in compliance with the Sparkplug specification and includes at least one metric name and initial data therefor and at least one PropertySet object associated with the metric name indicative of at least one parameter of the primary RTU device to be configured;
  processing the initial message payload from the primary RTU device on the SCADA server;

communicating a subsequent message payload from the SCADA server to the primary RTU device via the broker server, wherein the subsequent message payload includes one or more modified values for the PropertySet object for configuring the at least one parameter of the primary RTU device, and wherein the subsequent message payload is processed on the primary RTU device to configure the at least one parameter thereof based on the one or more modified values included in the PropertySet object of the subsequent message payload; and communicating the subsequent message payload from the SCADA server to the secondary RTU device via the broker server, wherein the subsequent message payload is processed on the primary and secondary RTU devices to synchronize the at least one parameter of the secondary RTU device with the at least one parameter of the primary RTU device.

2. The method of claim 1, wherein receiving the initial message payload from the primary RTU device at the SCADA server comprises receiving a birth message in accordance with the Sparkplug specification from the primary RTU device, wherein the birth message includes the initial message payload.

3. The method of claim 1, wherein processing the initial message payload includes generating the subsequent message payload compliant with the Sparkplug specification for the primary RTU device in response to the initial message payload.

4. The method of claim 1, wherein communicating the subsequent message payload from the SCADA server to the primary RTU device comprises transmitting a command message in accordance with the Sparkplug specification from the SCADA server, wherein the command message includes the subsequent message payload.

5. The method of claim 1, wherein the at least one parameter of the primary RTU device comprises one or more of: an alarm threshold, an alarm priority, an alarm delay setting, a data logging frequency, a data source communications setting, a communications parameter, and a security parameter.

6. The method of claim 1, wherein the primary RTU device is used in a remote industrial or resource monitoring application, including at least one of: oil and gas, water and wastewater distribution, renewable energy monitoring and control, and flow metering.

7. The method of claim 1, further comprising receiving, at the SCADA server, a custom metric containing configuration version information published by the primary RTU device to detect changes made locally to the primary RTU device.

8. A method of configuring a primary remote terminal unit (RTU) device of a Supervisory Control and Data Acquisition (SCADA) system, the SCADA system comprising a SCADA server configured for monitoring one or more industrial assets and providing supervisory control thereof, the industrial assets including the primary RTU device and a secondary RTU device, the method comprising:

establishing communication between the primary RTU device and the SCADA server of the SCADA system via a broker server, wherein the broker server communicates in accordance with a Message Queuing Telemetry Transport (MQTT) messaging protocol, and wherein the SCADA server corresponds to a data collection and control host and the primary RTU device corresponds to an Edge of Network node in accordance with a Sparkplug specification for the MQTT messaging protocol;

generating an initial message payload on the primary RTU device, wherein the initial message payload is compliant with the Sparkplug specification;

communicating the initial message payload from the primary RTU device to the SCADA server via the broker server for processing the initial message payload on the SCADA server, wherein the SCADA server discerns device type information in the initial message payload to construct at least one parameter of the primary RTU device to be configured;

receiving a subsequent message payload from the SCADA server at the primary RTU device via the broker server, wherein the subsequent message payload is generated on the SCADA server in compliance with the Sparkplug specification in response to the initial message payload and includes one or more values for a PropertySet object for configuring the at least one parameter of the primary RTU device;

processing the subsequent message payload on the RTU device to configure the at least one parameter thereof based on the one or more values included in the PropertySet object of the subsequent message payload; and communicating the subsequent message payload from the SCADA server to the secondary RTU device via the broker server, wherein the subsequent message payload is processed on the primary and secondary RTU devices to synchronize the at least one parameter of the secondary RTU device with the at least one parameter of the primary RTU device.

9. The method of claim 8, wherein communicating the initial message payload from the primary RTU device to the SCADA server via the broker server comprises transmitting a birth message in accordance with the Sparkplug specification from the primary RTU device, wherein the birth message includes the initial message payload.

10. The method of claim 8, wherein receiving the subsequent message payload from the SCADA server at the primary RTU device comprises receiving a command message in accordance with the Sparkplug specification from the SCADA server, wherein the command includes the subsequent message payload.

11. The method of claim 8, wherein the at least one parameter of the primary RTU device comprises one or more of: an alarm threshold, an alarm priority, an alarm delay setting, a data logging frequency, a data source communications setting, a communications parameter, and a security parameter.

12. The method of claim 8, wherein the primary RTU device is used in a remote industrial or resource monitoring application, including at least one of: oil and gas, water and wastewater distribution, renewable energy monitoring and control, and flow metering.

13. The method of claim 8, further comprising publishing, by the primary RTU device, a custom metric containing configuration version information published by the primary RTU device, wherein the SCADA server detect changes made locally to the primary RTU device based on the configuration version information.

* * * * *